United States Patent [19]

Smirne

[11] 4,076,483
[45] Feb. 28, 1978

[54] APPARATUS FOR EJECTING MOLDED ARTICLE

[76] Inventor: Frank S. Smirne, 1240 Washington St., Whitehall, Pa. 18052

[21] Appl. No.: 761,600

[22] Filed: Jan. 24, 1977

[51] Int. Cl.$^2$ .......................... B29F 1/14; B29C 7/00; B29H 7/08
[52] U.S. Cl. .................................. 425/444; 425/119; 425/129 S; 249/68
[58] Field of Search ............ 425/129 R, 436 R, 129 S, 425/444; 249/68

[56] References Cited

U.S. PATENT DOCUMENTS

| 2,330,369 | 9/1943 | Marsh | 425/128 X |
| 2,587,070 | 2/1952 | Spillman | 249/68 X |
| 2,876,495 | 3/1959 | Spillman | 249/68 X |
| 3,044,120 | 7/1962 | Wishoff et al. | 249/68 |
| 3,914,086 | 10/1975 | Hujik | 425/129 S X |

Primary Examiner—J. Howard Flint, Jr.
Attorney, Agent, or Firm—William B. Noll

[57] ABSTRACT

A mold for forming an article such as a unitary sole and heel tread member of a shoe, and means integral with said mold for separating said article from such mold. The mold for such article is formed of first and second mold members defining a molding cavity therein, where one of said mold members is provided with an ejector pin projecting into said molding cavity to grip the article after forming. When the mold members are operatively assembled together for molding, where one of said mold members has been provided with conduit means for supplying casting material under pressure to said molding cavity, injection of the casting material through such conduit means to fill the molding cavity will result in the casting material flowing about said ejector pin. Such ejector pin is provided with a head or end configuration which is capable of gripping the molded article to pull or peel such member from one of the mold members, when such mold members are disassembled. While the casting material is molded about the head or end of the ejector pin, the end is designed so as to pull the molded article from the mold member, and at the same time not tear or damage the molded article. Similarly, an ejector pin may be employed to lift and remove the runner or sprue from the fixed or stationary mold member.

5 Claims, 6 Drawing Figures

4,076,483

APPARATUS FOR EJECTING MOLDED ARTICLE

BACKGROUND OF THE INVENTION

The art of shoemaking has progressed from each individual shoe being built up on a shoe last to the stage where the shoe may be formed of man-made materials, such as plastics, and built up through one or more injection molding cycles. Styling changes, with the continued introduction of new molding materials, have caused the shoemaking industry to be faced with new and different requirements in shoe construction and injection molding apparatus for manufacturing same. These new and different requirements present a particular challenge to the shoemaking industry as they must continue to monitor and reduce production costs. That is, the shoemaking industry must diligently seek to achieve high production rates with low cost manufacturing techniques.

High production rates, as for example in the injection molding of a unitary sole and heel tread member, have been hampered by the slowness in which the molded article is released from the mold clearing such mold for reuse. Typically, the tread configuration of the unitary sole is ribbed such that there is considerable surface contact between the tread and the adjoining mold member. As a consequence, the unitary sole and heel tread member adheres tightly to the adjoining mold member. Valuable production time is lost in freeing the tread member from the mold member.

The recognition of this problem with lost production time is not new. A common non-mechanical method widely used in the shoe industry is called peeling or pulling out the unit sold by hand. Pliers or a similar device is used to grip the molded unit sole. This is time consuming and can result in damage to the molded article. Mechanical means have now been introduced by the industry in an attempt to reduce production time. An injector device for injection molding apparatus is taught, for example, in U.S. Pat. No. 3,914,086 to Hujik. Such patent teaches an ejector device which comprises a plurality of fingers slidably mounted in and forming a part of one mold member. Pressure means are provided for thrusting said fingers against the molded article to eject such article from said mold member. Other mechanical systems use air under pressure or a stripper plate to assist to removing the molded unit sole from the mold.

One significant disadvantage of such ejector systems is the cost of incorporating such systems into the mold member. Further, there are maintenance and possible replacement costs due to the use of movable parts. Production time and cost increases as a result of the operation and care of the pressure or activitating means thereof.

The present invention does not suffer from these disadvantages. The ejector device of this invention is simple, efficient, and requires no moving parts. Such device may be installed quickly in new or existing injection molding apparatus with little difficulty. All of the novel features of this invention will become apparent from the description to follow.

SUMMARY OF THE INVENTION

This invention is directed to a mold for forming an article such as a unitary sole and heel tread member of a shoe, and to means integral with said mold for separating said article from such mold. The mold for such article is formed of first and second mold members which are movable relative to each other. When operatively joined together the mold members define a molding cavity therebetween. One of said mold members is provided with an ejector pin projecting into said molding cavity to grip the article after forming. When the mold members are operatively joined together for molding, where one of said mold members has been provided with a conduit or runner system for supplying casting material under pressure to said molding cavity, injection of the casting material through such conduit to fill the molding cavity will result in the casting material flowing about said ejector pin. The ejector pin is provided with a head or end configuration which is capable of gripping the molded article to pull or peel such member from one of the mold members, as such mold members are moved from a joined position to a spaced apart position. While the casting material is molded about the head or end of the ejector pin, the end is designed so as to pull the molded article from the mold member, and at the same time not tear or damage the molded article. Similarly, an ejector pin may be employed to lift and remove the runner or sprue from the fixed or stationary mold member.

DESCRIPTION OF PREFERRED EMBODIMENT

Figure 1:
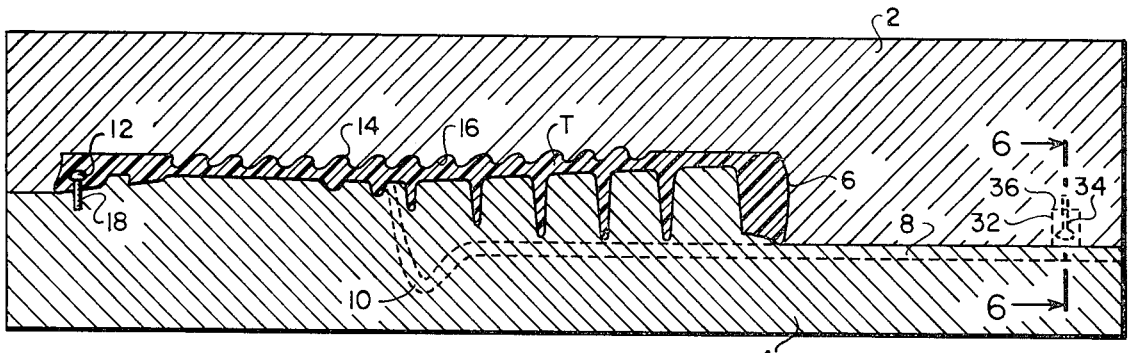
FIG. 1 is a sectional view of molding apparatus, in the joined or mold injection/curing position, incorporating the ejector pin of this invention.

Referring now to the drawings in general, and in particular to FIG. 1, there is shown a mold assembly having a top mold member 2 and a bottom mold member 4. Said mold members, when operably joined together in the manner illustrated in FIG. 1 define a molding cavity 6. The molding cavity 6 defines the desired shape of the article to be formed. For purposes of illustration, the article to be formed is a unitary sole and heel tread member. This should not be read as a limitation of this invention, however, for the teachings of this invention may be applicable to the molding of other articles. Nevertheless, for convenience, the further description shall be limited to the molding of such unitary sole and heel tread member.

The mold assembly of this invention is particularly adapted for forming such tread members of polyurethane material injected into molding cavity 6. When the polyurethane is cured, it is flexible, yet tough, and is ideally suited for use in the manufacture of fashionable but durable shoes.

Polyurethane materials suitable for use herein are now well established in the injection molding art. Nevertheless, a desirable resilient polyurethane for use as a tread member is prepared by condensation and polymerization of a material having a plurality of active hydrogen groups with a material having a plurality of NCO groups. A wide variety of materials providing active hydrogen may be used; but it is preferred to use a mixture of diols and diamines.

The polyurethane material may be expanded to form the desired molded article by the interaction of water with isocyanate to generate $CO_2$. Alternatively, volatile organic liquids such as methylene chloride, trichloromonofluoromethane and other volatile halogenated, preferably fluorine-containing organic liquids, may be used. When water is used, from 0.2 to 0.5%, preferably about 0.3% is used based on the weight of the resinous material. Where a volatile organic liquid is used, there will ordinarily be used from about 5 to about 7 parts by weight of the organic liquid based on 100 parts by weight of the resin material.

Any of the conventional catalyst systems may be used for insuring rapid and complete reaction of the components. A very satisfactory catalyst system is that shown in U.S. Pat. No. 3,670,070.

Returning now to FIG. 1, the polyurethane material is injected into the molding cavity 6 through an injection channel 8 and tunnel 10. The material fills the molding cavity and surrounds the ejector pin 12, to be discussed hereinafter. Following injection, the mold members 2 and 4 remain closed while the tread member T cures or hardens.

Fashion and comfort of the ultimate shoe often dictates the design of the tread member. As shown in FIG. 1, the tread or walking surface is typically characterized by multiple ribs 14. The deep ribs 14 offer a broad surface contact between the tread member and the molding cavity surface 16. It will be noted that nearly the full cavity for the unit sold is contained within mold member 2. As a consequence, the formed tread member T is virtually held in a vice-like grip by the mold member 2. Herein lies the difficulty in removing such tread member T from mold member 2.

Figure 2:
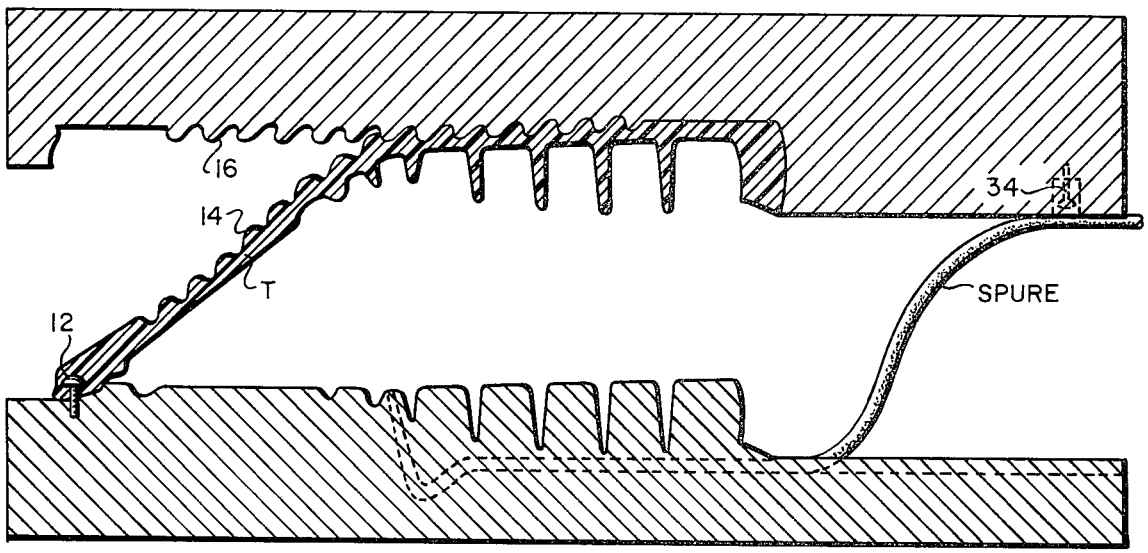
FIG. 2 is a section view of molding apparatus, in the separated or molded article removal position, incorporating the ejector pin of this invention.

The ejector mechanism of the present invention takes advantage of the relative movement of the mold members 2 and 4 (from the position of FIG. 1 to position of FIG. 2). This will be understood from the discussion which follows.

Figure 3:
FIG. 3 is an enlarged front view of a preferred ejector pin made according to this invention and suitable for use in the apparatus of FIGS. 1 and 2.
Figure 4:
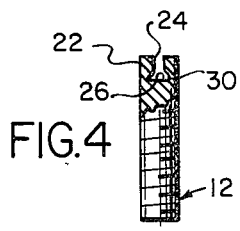
FIG. 4 is an enlarged front view of a modified ejector pin made according to this invention and suitable for use in the apparatus of FIGS. 1 and 2.

Within the cavity of the mold member 4 a hole 18 is drilled and tapped to receive the fixed ejector pin 12. As shown in FIG. 3, the head 20 preferably is eliptical or round. FIG. 4 shows an alternate embodiment. Here the head 22 is characterized by a circular recess 24 having a first cross section throughout a portion thereof, and an end 26 with a larger cross section. With each ejector pin the head configuration is characterized by a shoulder 28, 30 against which pressure may be exerted by the fixed ejector pin 12 to grip or peel the unit sole from the mold member 2.

The fixed ejector pin 12 may be adjusted to project a predetermined distance into the molding cavity. This can be accomplished merely by turning the threaded ejector pin in a conventional manner. Such a simple adjustment means assures an operator of the proper grip which must be exerted on the molded article to effect its removal, i.e. peeling, from the mold cavity. In any case, the head portion must extend a distance into the cavity 6 such that the shoulder 28, 30 is encased by the molding material.

An ancillary but nevertheless important feature of this invention is the removal of the runner or sprue. In the molding of unit soles, the right and left unit soles are normally molded side by side. A runner system (channel 8 — tunnel 10) or sprue is used to act as a conduit in filling the molding cavities with the plastic molding material. This runner system cures and solidifies in the manner of the molded article. Likewise, the runner system must be removed before the molding cycle may continue. An effective system of runner removal is offered by the present invention.

Figure 5:
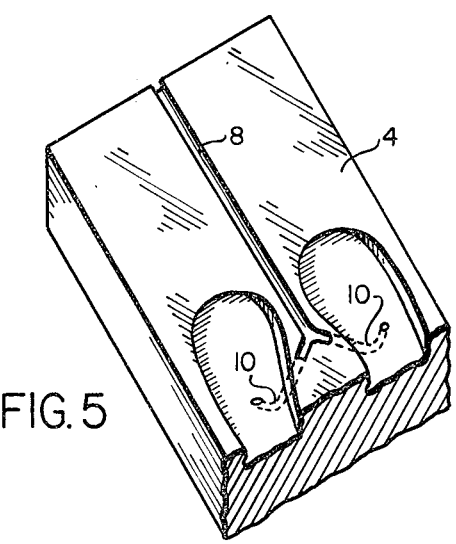
FIG. 5 is a partial perspective view of the runner system for the molding apparatus of this invention.
Figure 6:
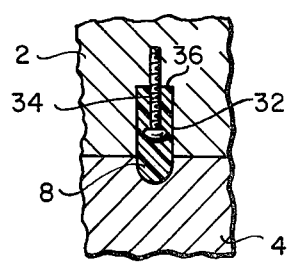
FIG. 6 is an enlarged fragmentary sectional view of the ejector pin for lifting the sprue from the runner system shown in FIG. 5.

Typically, the runner system is a channel 8 on the top surface of the stationary or mold member 4. The channel 8 typically runs between the left and right mold cavities (see FIG. 5) and terminates at a tunnel 10 which leads to the cavity. Thus, it is through the tunnel 10 and channel 8 that the plastic material is injected into the molding cavity. To effect removal of the runner system according to this invention a recess 32 in mold member 2, aligned with the channel 8, is provided. Within said recess a fixed ejector pin 34 threadably engages the end 36 of said recess 32, note FIGS. 5 and 6.

During the injection molding process plastic material fills such recess 32 and engages the ejector pin 34 in the manner described above. Upon the movement of the mold members the fixed ejector pin 34 for the runner system lifts the "sprue" from the channel 8 (see FIG. 2). This enables the machine operator to reach in and grasp the runner while removing the molded unit soles from the molds.

In practice the ejector system of this invention has been tested on a two station machine, producing two pairs of shoe soles, and resulted in an increase in production from 220 pair/8 hr. shift to 515–530/8 hr. shift. The precise improved results one might gain from the adoption of the present invention depends in part upon the complexity of the shoe's tread design and the molding material.

These same factors, among others, dictate the shape of the ejector pin's head, the height of projection into the molding cavity, and the number of fixed ejector pins needed. By way of example, in molding a unit sole sized (10) from Kraton, manufactured by Shell Chemical Co., a single fixed ejector pin for each molding cavity and having a rounded head approximately ¼ inches diameter, was threaded into the toe end of the stationary mold's cavity portion so as to project about   inch into the molding cavity. Such a fixed ejector pin was found adequate to peel the unit sole from the upper or movable mold.

As suggested above, design and material changes can impose design changes on the fixed ejector pin. FIG. 3 depicts the preferred fixed ejector pin showing a rounded or eliptical shaped head. The tapered underside of the head facilitates release of the unit sole without damaging or tearing the unit sole. However, in some situations a normal crown head with a flat underside for the fixed ejector pin may be needed. Such a fixed ejector pin will grip better but may create a severe undercut. Thus, the molding conditions, designs and materials must be evaluated together to determine the size, shape and number of fixed ejector pins required. Invariably adjustments will have to be made, such as by the axial movement of the fixed ejector pin into or out of mold member 4, however, it is believed that all information necessary to make such adjustments are fully contained within these specifications. Accordingly no limitation is intended to be imposed thereon except as set forth in the appended claims.

I claim:

1. In apparatus for molding a finished article of plastic in the form of a unitary sole and heel member, which apparatus comprises first and second cooperable mold members, said mold members when operatively joined together define a molding cavity, access means to said molding cavity for supplying a heat curable plastic material to said molding cavity for molding, and means to move said mold members relative to one another from a position of operativeness to a position of inoperativeness, the improvement comprising in combination therewith the provision of an adjustable ejector pin projecting from one of said mold members into said molding cavity a predetermined depth, such that when said mold members are operatively joined together and plastic material is supplied to said molding cavity said plastic material will form about said ejector pin, said ejector pin characterized by a head portion which is adapted to grip the molded finished article and peel such finished article from a mold member when said mold members are moved to a position of inoperativeness, and characterized further in that said head portion is provided with a beveled shoulder capable of gripping without tearing the molded finished article upon removal from the mold member.

2. The apparatus according to claim 1 wherein said ejector pin is characterized by a shank having a cap thereon, said cap being provided with a beveled annular shoulder.

3. The apparatus according to claim 1 wherein said ejector pin is characterized by a uniform shank whose head portion has been axially bored.

4. The apparatus according to claim 1 including means to adjust the depth of projection of said ejector pin into such molding cavity.

5. The apparatus according to claim 1 wherein said access means for supplying plastic material to said molding cavity comprises a runner system along the mating surface of one of said mold members, and that the other of said mold members is provided with an ejector pin which is capable of withdrawing the portion of said supplied plastic material remaining in said runner system.

* * * * *